United States Patent [19]
Matsumoto

[11] Patent Number: 6,022,230
[45] Date of Patent: Feb. 8, 2000

[54] COLUMN SWITCH WITH ROTARY CONNECTOR

[75] Inventor: Tsuyoshi Matsumoto, Tokyo, Japan

[73] Assignee: Niles Parts Co., Ltd., Japan

[21] Appl. No.: 09/179,854

[22] Filed: Oct. 28, 1998

[30] Foreign Application Priority Data

Dec. 26, 1997 [JP] Japan ................................... 9-366617

[51] Int. Cl.$^7$ ................................................ H01R 35/04
[52] U.S. Cl. ........................ 439/164; 439/15; 200/61.54; 200/61.27
[58] Field of Search .................. 439/164, 15; 200/61.54, 200/61.27

[56] References Cited

U.S. PATENT DOCUMENTS

| | | | |
|---|---|---|---|
| 5,714,727 | 2/1998 | Lecznar et al. | 439/15 |
| 5,721,408 | 2/1998 | Yokota et al. | 439/164 |
| 5,747,763 | 5/1998 | Uchiyama et al. | 439/15 |
| 5,766,019 | 6/1998 | Matsumoto et al. | 439/15 |
| 5,769,649 | 6/1998 | Welschholz et al. | 439/164 |
| 5,773,776 | 6/1998 | Uleski et al. | 439/15 |
| 5,800,191 | 9/1998 | Honda et al. | 439/164 |
| 5,883,348 | 3/1999 | Yokoyama | 439/15 |

FOREIGN PATENT DOCUMENTS 3-43053  4/1991  Japan .

*Primary Examiner*—Gary F. Paumen
*Attorney, Agent, or Firm*—Rader, Fishman & Grauer; Ronald P. Kananen

[57] ABSTRACT

A column switch is provided with a rotary connector that makes electrical connection between a steering wheel and a vehicle by means of a coiled, flexible, flat cable 5 accommodated in a housing. The housing includes a lower housing defined by a base 1 of the column switch and an upper housing defined by a rotor 6 with a cancel cam 6f. The base 1 has a hollow cylinder 1a through which a steering shaft 2 is inserted in line with the hollow cylinder, and an annular groove 1b surrounding the hollow cylinder 1a and accommodating the flat cable 5 therein. The rotor 6 has an accommodating section 6c that closes the annular groove 1b, and a resilient fastening strap 6e that rotatably engages a fastening portion 1e formed on the hollow cylinder 1a. Since the same construction serves as both the base of the column switch and the housing of a rotary connector, the number of parts and assembly costs are minimized.

10 Claims, 4 Drawing Sheets

COLUMN SWITCH WITH ROTARY CONNECTOR

BACKGROUND OF THE INVENTION

1. Field of the Invention

The present invention relates to a column switch with a rotary connector where a base of the column switch is formed integral with an on-vehicle rotary connector for making electrical connection between a steering wheel and a steering column of the vehicle.

2. Description of the Related Art

A conventional column switch with a rotary connector is disclosed, for example, in Japanese Utility Model Preliminary Publication (Kokai) No. 3-43053. This conventional structure includes a rotary connector having a spiral-coiled tape for electrically connecting a steering wheel and a steering column of a vehicle, and a column switch having, for example, an operation lever for a direction indicator. The rotary connector and the column switch are separate items. The rotary connector has a lower housing secured on a base of the column switch and an upper housing secured to an underside of the steering wheel.

However, the conventional structure described above suffers from a problem that the base of the column switch and the housing of the rotary connector are separate items, requiring a relatively large number of parts and man-hours for assembly. Moreover, the construction requires a large mounting space.

SUMMARY OF THE INVENTION

An object of the present invention is to provide a column switch and rotary connector structure that solves the problems associated with the conventional structure described above.

More specifically, an object of the present invention is to provide a structure that serves as both a base for the column switch and a housing for the rotary connector thereby reducing the number of parts and overall cost.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention in order to achieve the objects set forth above, a column switch having a rotary connector is provided that electrically connects a steering wheel and a vehicle by means of a flexible flat cable in a spiral accommodated in the housing. The housing includes a lower housing defined by a base of the column switch and an upper housing defined by a rotor having a cancel cam.

According to another aspect of the present invention, the base of the column switch has a hollow cylinder through which a steering shaft is inserted in line with the hollow cylinder, and an annular groove surrounding the hollow cylinder and accommodating the flat cable therein. The rotor has a resilient fastening strap and an accommodating section that closes the annular groove. The resilient fastening strap rotatably engages a fastening portion formed on the hollow cylinder.

According to another aspect of the present invention, the base of the column switch has a hollow cylinder through which a steering shaft is inserted in line with the hollow cylinder, and an annular groove surrounding the hollow cylinder and accommodating the flat cable therein. The rotor closes the annular groove. The rotor has an annular projection that rotatably engages the resilient fastening strap formed in the annular groove.

According to yet another aspect of the present invention, the cancel cam and the annular projection are formed on the outer circumference of the rotor. The annular projection is formed below the cancel cam and projects radially outwardly of the hollow cylinder farther than the cancel cam.

According to still another aspect of the present invention, the flat cable has terminals on both ends of the flat cable. One of the terminals is fixed to the base and the other of the terminals is secured to the rotor.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
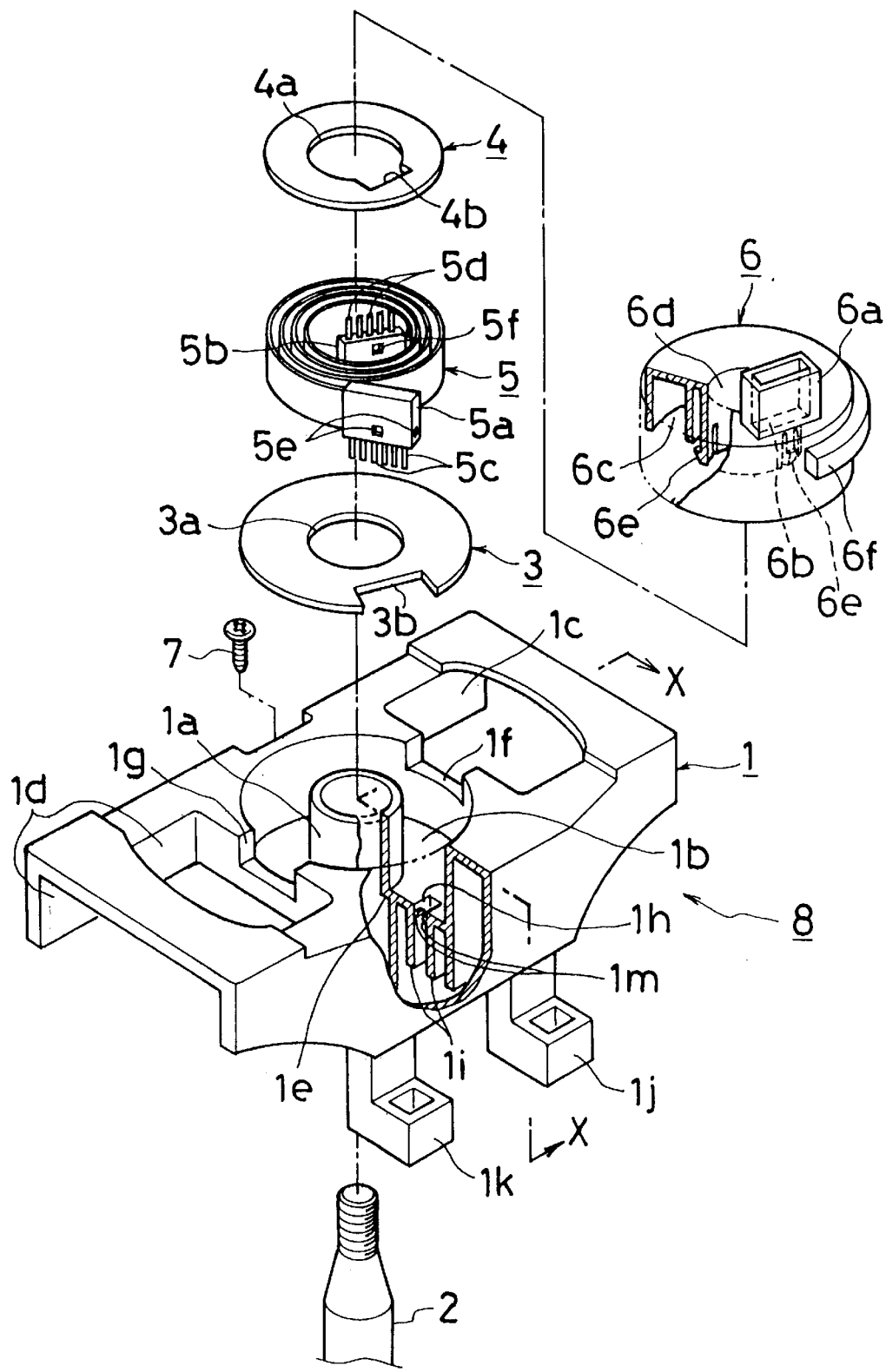
FIG. 1 is an exploded perspective view illustrating a first embodiment of the invention.
Figure 2:
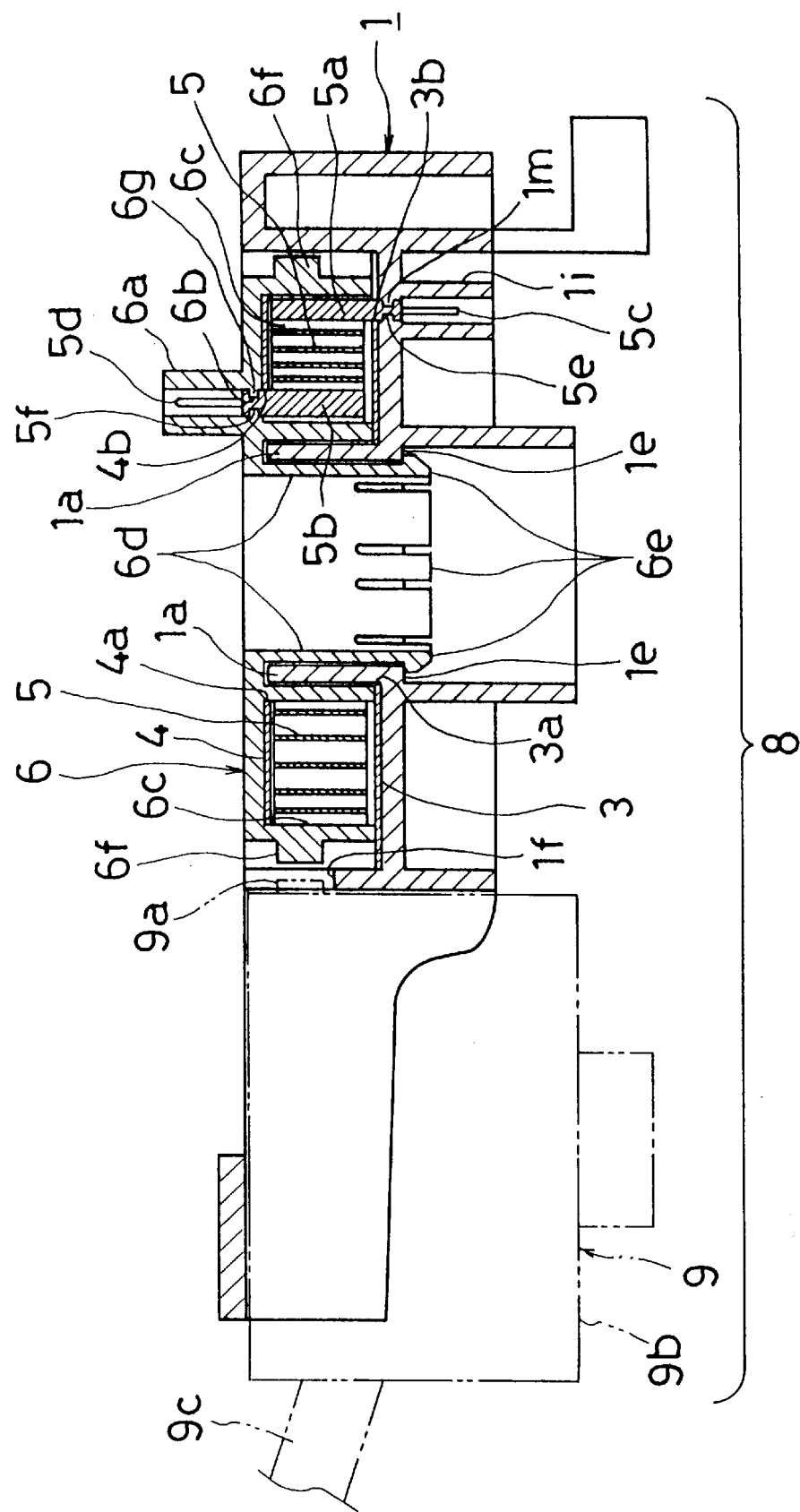
FIG. 2 is an enlarged cross-sectional view taken along lines X—X of FIG. 1, illustrating the first embodiment when the respective parts are assembled together.

A first embodiment of the present invention will be described in detail with reference to FIGS. 1 and 2 of the drawings. Reference numeral 1 denotes a base of a column switch 8 having a hollow cylinder 1a through which a steering shaft 2 is inserted in line with the hollow cylinder 1a. The base 8 has mounting sections 1j and 1k fittingly mounted to a steering column, not shown, and is secured to the steering column by a screw 7. The base 1 has an annular groove 1b surrounding the hollow cylinder 1a. The annular groove 1b accommodates upper and lower slide sheets 3 and 4, a flat cable 5, and a rotor 6 inserted therein. The base 1 is formed with recesses 1c and 1d in the left and right sides of the base 1. The recesses 1c and 1d fittingly receive bodies 9b of, for example, a turn signal switch 9 and a wiper washer switch, respectively.

The hollow cylinder 1a has a fastening portion 1e in the form of a stepped portion with which a resilient fastening strap 6e formed on an inner wall of the rotor 6 is engaged. The annular groove 1b communicates with the recesses 1c and 1d through cutouts 1f and 1g formed on the left and right sides, respectively. A cancel claw 9a of the turn signal switch 9 extends into or retracts from the annular groove 1b through the cutouts 1f or 1g.

The base 1 has the two cutouts 1f and 1g so that the construction can commonly be applied to both a left-hand drive vehicle and a right-hand drive vehicle. For a right-hand drive vehicle, the turn signal switch 9 is inserted into the recess 1c so that operating the operation lever 9c causes the cancel claw 9a to extend into or retract from the annular groove 1b through the cutout 1f. For a left-hand drive vehicle, the turn signal switch 9 is inserted into the recess 1d so that operating the operation lever 9c causes the cancel claw 9a to extend into and retract from the groove 1b through the cutout 1g. There is provided a connector-inserting hole 1h formed in a bottom surface of the hollow cylinder 1a. The connector-inserting hole 1h receives a terminal 5a attached to an outer end of a flat cable 5.

The steering shaft 2 is rotatably inserted into the steering column extending through the hollow cylinder 1a and hollow shaft cylinder 6d. The steering shaft 2 is fixedly mounted to the steering wheel and rotates together with the rotor 6 whenever the steering shaft 2 is rotated.

The slide sheets 3 and 4 are each a thin flat ring made of an oleo-resin having a high lubrication property. The slide sheet 3 is disposed under the flat cable 5 and is formed with a hole 3a in the middle thereof into which the hollow cylinder 1a fits, and a cutout 3b in an outer circumference through which the terminal 5a is inserted. The slide sheet 4 is disposed over the flat cable 5 and has a hole 4a formed in the middle thereof into which the hollow cylinder 1a fits, and a cutout 4b in an inner circumference thereof through which the terminal 5b is inserted.

The flat cable 5 includes flat thin conductors connected to the terminals 5c and 5d. The conductors are insert-moldings of highly lubricating resin shaped like a thin belt. The flat cable 5 has a terminal 5a on an outer end thereof and a terminal 5b on an inner end thereof. The flat cable 5 is wound in a spiral shape and is accommodated in the annular groove 1b with the slide sheet 3 under the flat cable 5 and the slide sheet 4 over the flat cable 5. Then, the rotor 6 is fitted over the flat cable 5, thereby accommodating the flat cable in the annular groove 1b.

The terminal 5a is formed with fastening holes 5e in an outer surface of the terminal 5a, and has the fastening holes 5e engaging fastening projections 1m formed on an inner wall of the connector-inserting hole 1h. The terminal 5a has terminals 5c projecting downward. Upon fittingly mounting the terminal 5a into the connector-inserting hole 1h formed in the bottom of the annular groove 1b, the terminals 5c are placed in position in the connector space 1i. The connector space 1i communicates with the connector-inserting hole 1h.

The terminal 5b is substantially the same shape as the terminal 5a. The terminal 5b has terminals 5d projecting upward from an upper surface of the terminal 5b, and fastening holes 5f formed in an outer surface of the terminal 5b. The fastening holes 5f are engaged with fastening projections 6g formed on an inner wall of the connector housing 6a that defines the connector-inserting hole 6b. When the terminal 5b has been fitted into the connector-inserting hole 6b formed in a ceiling of the rotor 6, the terminal 5b is placed in position in the connector housing 6a formed on the rotor 6.

The rotor 6 is a doughnut-shaped case-like rotating body that rotates with the steering wheel. The connector housing 6a formed on the rotor 6 and upwardly projecting from the rotor 6 fits to its mating connector, not shown, provided under the steering wheel, thereby positioning the rotor 6 with respect to the steering wheel.

The rotor 6 has an accommodating section 6c that encloses the flat cable 5 from above. The rotor 6 is rotatably inserted into the annular groove 1b. The rotor 6 has a hollow shaft cylinder 6d through which the steering shaft 2 is inserted in line with the hollow shaft cylinder 6d. The hollow shaft cylinder 6d has a plurality of resilient fastening straps 6e, which are rotatably inserted into the hollow cylinder 1a and rotatably engage the fastening portion 1e formed on the hollow cylinder 1a. The rotor 6 has a cancel cam 6f formed on its outer circumference, the cancel cam 6f striking the cancel claw 9a of the turn signal switch 9.

The cancel cam 6f is not limited in number and shape to those of the present embodiment. The rotor 6 may be assembled to the base 1 with a coil spring placed between the rotor 6 and the base 1 so that the rotor 6 presses the underside of the steering wheel at all times. The resilient fastening straps 6e of the rotor 6 and the fastening portion 1e of the base 1 may be reversed with their location. That is, the fastening portion 1e may be formed on the hollow shaft cylinder 6d, and the resilient fastening strap 6e may be formed on the hollow cylinder 1a.

The column switch 8 holds, for example, the bodies 9b of the turn signal switch 9 and the wiper switch fitted into the recesses 1c and 1d on the left and right sides of the column switch 8. The column switch 8 may have, for example, the turn signal switch 9 and wiper switch formed integrally with the base 1.

The turn signal switch 9 has an operation lever 9c which is mounted to the body 9b and pivots upward and downward. Operating the operation lever 9c to a left-turn position or a right-turn position causes the cancel claw 9a to advance into a path in which the cancel cam 6f rotates, so that the cancel cam 6f strikes the cancel claw 9a.

The assembly procedure and operation of the first embodiment of the aforementioned construction will now be described in detail.

Switches such as the turn signal switch 9 and wiper switch, not shown, are fitted into the recesses 1c and 1d of the base 1. The slide sheet 3 is placed on the bottom surface of the annular groove 1b with the hollow cylinder 1a extending through the hole 3a and with the cutout 3b in alignment with the connector inserting hole 1h.

Upon inserting the terminal 5a into the fitting hole 1h through the cutout 3b, the fastening projection 1m engages the hole 5e to fix the terminal 5a at the outer end of the flat cable 5 accommodated in the annular groove 1b of the base 1, thus positioning the terminals 5c in the connector space 1i. The flat cable 5 is placed to form a spiral around the hollow cylinder 1a surrounded by the annular groove 1b.

The slide sheet 4 is placed on the flat cable 5 with the cutout 4b in alignment with the terminal 5b. The terminal 5b is inserted into the connector-inserting hole 6b from under the rotor 6, so that the fastening hole 5f engages the fastening projection 6g. Thus, the terminal 5b at the inner end of the cable 5 is fixedly mounted to the rotor 6, and the terminals 5d are positioned in the connector housing 6a.

The rotor 6 is assembled into the column switch 8 by pushing the hollow shaft cylinder 6d into the hollow cylinder 1a so that the resilient fastening strap 6e rotatably engages the fastening portion 1e. A housing that covers the flat cable 5 includes a lower part defined by the base 1 of the column switch 8 and an upper part defined by the rotor 6 of the cancel cam 6f, thereby reducing the number of parts and man-hours for assembly as well as saving space.

The base 1 has the mounting sections 1j and 1k fitting to a bracket of the steering column and is secured to the steering column by the screw 7. The connector housing 6a is fitted to the mating connector on the underside of the steering wheel, and the steering wheel is fixed to the steering shaft 2, thereby positioning the rotor 6 in place.

When the steering wheel is operated, the steering wheel rotates together with the rotor 6 and the terminal 5b connected to one end of the flat cable 5. If the operation lever 9c has been positioned at either the left-turn position or the right-turn position, the cancel cam 6f strikes the cancel claw 9a, thereby allowing the operation lever 9c to return to the neutral position.

Figure 3:
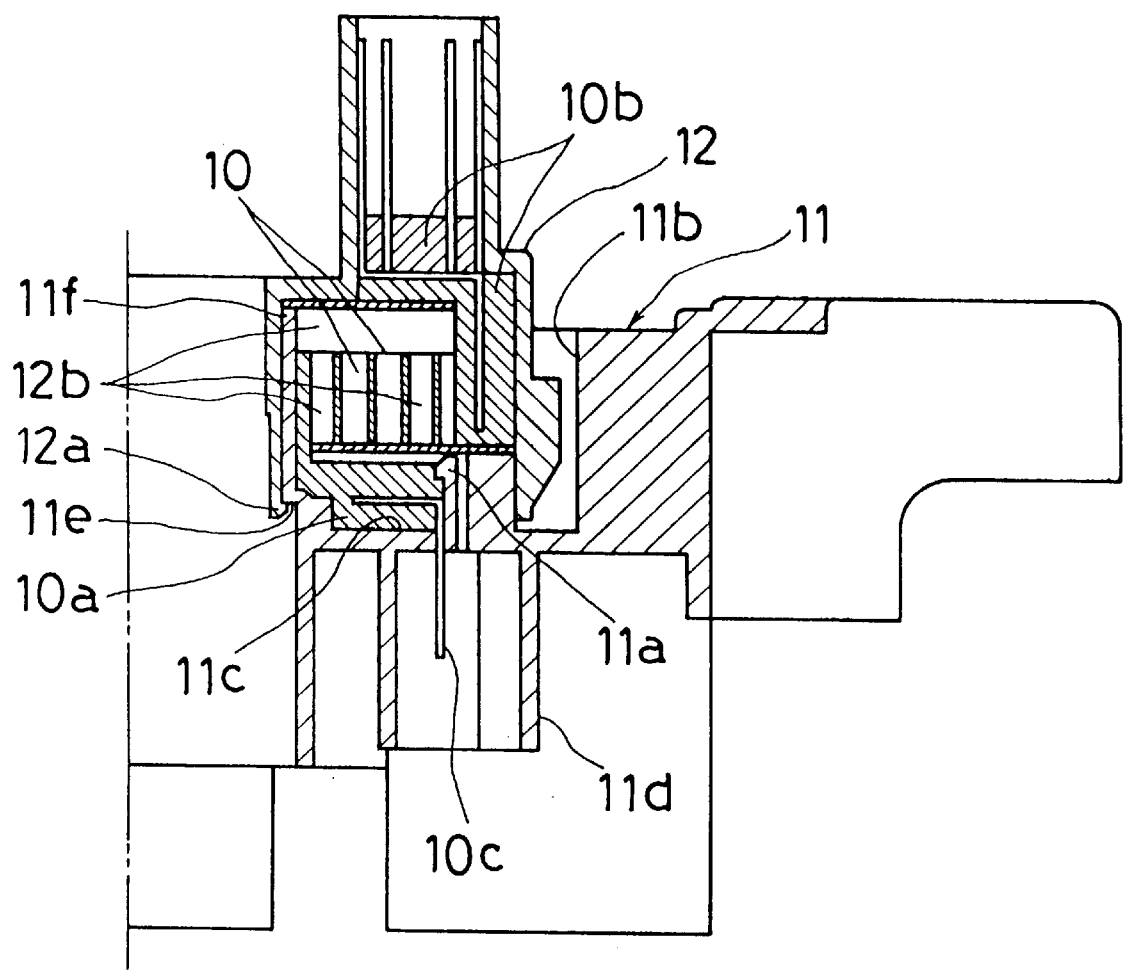
FIG. 3 is a half cross-sectional view illustrating a second embodiment of the invention.

A second embodiment will be described in detail with reference to FIG. 3 of the drawings.

A flat cable 10 is in the form of a spiral. As opposed to the first embodiment, a terminal 10a connected to an inner end of the flat cable 10 is fitted to a base 11, and a terminal 10b connected to an outer end of the flat cable 10 is fitted to a rotor 12. In other words, the terminals 10a and 10b may be provided on the base 11a nd rotor 12, respectively, or they may be reversed.

A wall defining an accommodating section 12b is formed with resilient fastening straps 12a that rotatably engage the base 11. The resilient fastening strap 12a engages a fastening portion 11e formed in the hollow cylinder 11f.

The terminal 10a is fixed to the bottom 11c of the groove 11b by a fastening tongue 11a. Terminals 10c of the terminal 10a extend through the bottom 11e of the base 11 so that the terminals 10c are positioned in place in a connector housing 11d. The terminal 10a may be fixed by any means at any location on the base 11.

Figure 4:
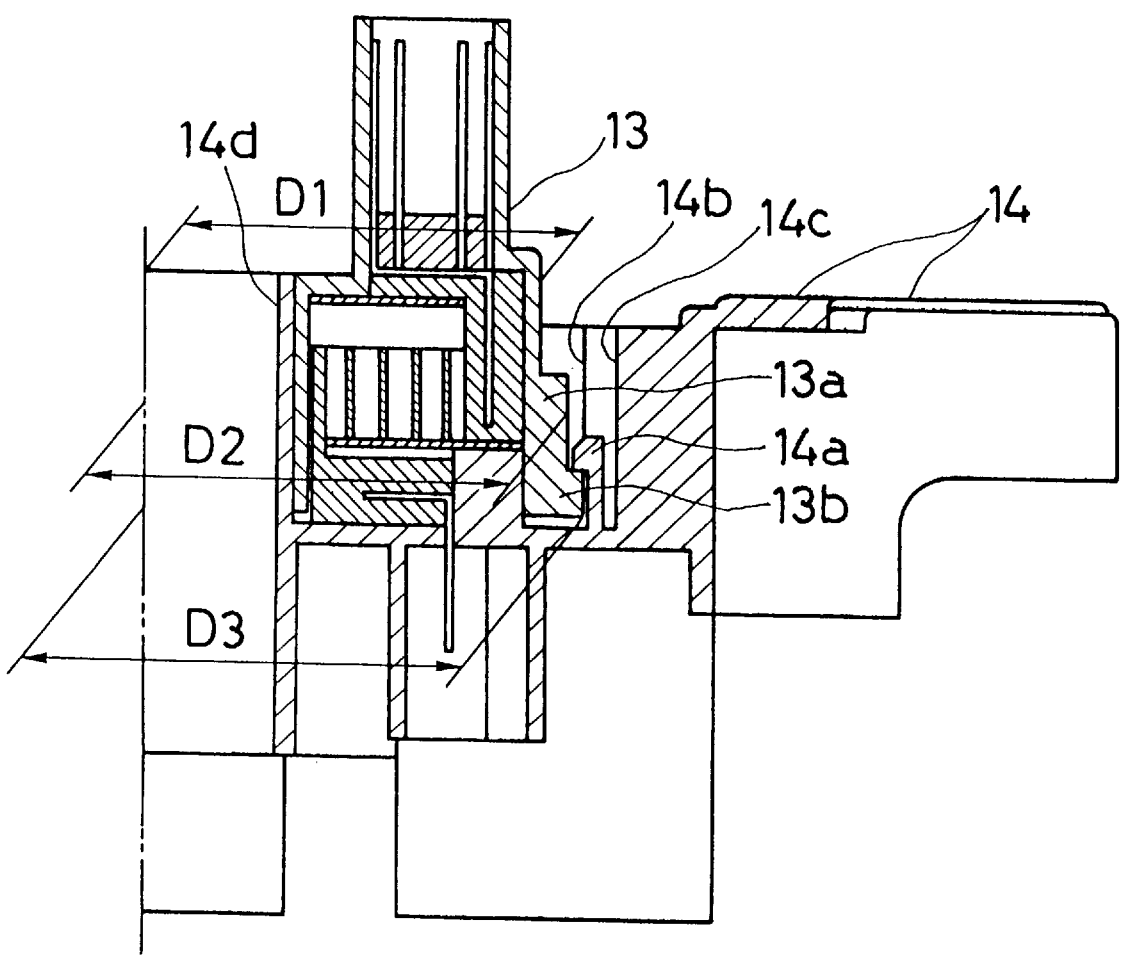
FIG. 4 is a half cross-sectional view illustrating a third embodiment of the invention.

A third embodiment of the invention will be described in detail with reference to FIG. 4 of the drawings.

A resilient fastening strap 14a of the third embodiment is another version of the resilient fastening strap and allows a rotor 13 to rotatably engage a base 14. An outer wall defining an annular groove 14b is partially cut away to form a groove 14c, leaving a resilient fastening strap 14a substantially flush with the inner surface of the outer wall of the annular groove 14b.

The resilient fastening strap 14a engages an annular projection 13b formed at a lower part of the cancel cam 13a of the rotor 13. A plurality of the resilient fastening straps 14a are required, but the number of the resilient fastening straps 14a is not limited.

The dimensions should be related so that D1<D2<D3 where D1 is the outer diameter of the rotor 13, D2 is the distance from the center of a hollow cylinder 14d to a tip of the cancel cam 13a, and D3 is the distance from the center of the hollow cylinder 14d to the outer circumference of the annular projection 13b.

The present invention having the aforementioned structure provides the following advantages. The invention is a column switch having a rotary connector that electrically connects the steering wheel and the vehicle by means of a flexible flat cable in the form of a spiral accommodated in the housing. The housing includes a lower part defined by a base of the column switch and an upper part defined by a rotor having a cancel cam. In other words, the base also serves as the lower housing of the rotary connector and the rotor also serves as the upper housing, thereby reducing the number of parts and man-hours for assembly for cost reduction.

The invention is further defined by the base having a hollow cylinder through which a steering shaft is inserted in line with the hollow cylinder, and an annular groove which is formed to surround the hollow cylinder and accommodates the flat cable therein. The rotor has a resilient fastening strap and an accommodating section that closes the annular groove. The resilient fastening strap rotatably engages a fastening portion formed on the hollow cylinder. Thus, the flat cable accommodated in the annular groove of the base may be closed by the rotor rotatably assembled to the base, thereby utilizing the flat space of the base to save overall space.

The invention is further defined by the base having a hollow cylinder through which a steering shaft is inserted in line with the hollow cylinder, and an annular groove which is formed to surround the hollow cylinder and accommodates the flat cable therein. The rotor closes the annular groove. The rotor has an annular projection that rotatably engages a plurality of resilient fastening straps formed in the annular groove. This construction allows the rotor and the base to be assembled together in a simple, single assembly step, thus simplifying assembly procedure and saving man-hours and assembly time. Therefore, the structure provides simple assembly operation.

The invention is further defined by the cancel cam and the annular projection being formed on the outer circumference of the rotor. The annular projection is formed below the cancel cam and projects radially outwardly of the hollow cylinder farther than the cancel cam. Thus, there is no need to provide a stepped portion in the hollow cylinder of the base.

The invention is further defined by the flat cable having terminals on both ends thereof. One of the terminals is fixed to the base and the other of the terminals is secured to the rotor. As a result, one end of the flat cable can be attached to the base and the other end to the rotor, respectively, in a simple, single assembly step.

It will be appreciated that the present invention is not limited to the exact construction that has been described above and illustrated in the accompanying drawings and that various modifications and changes can be made without departing from the scope and spirit thereof. It is intended that the scope of the invention only be limited by the appended claims.

What is claimed is:

1. A column switch (8) having a rotary connector which electrically connects a steering wheel and a vehicle by means of a flexible flat cable (5, 10) in a spiral shape accommodated in a housing, the housing comprising:

a lower part defined by a base (1, 11, 14) of the column switch (8); and an upper part defined by a rotor (6, 12, 13) having a cancel cam (6f, 13a).

2. The column switch having a rotary connector according to claim 1, wherein the base (1, 11) further comprises:

a hollow cylinder (1a, 11f) through which a steering shaft (2) is inserted in line with the hollow cylinder; and an annular groove (1b, 11b) which is formed to surround the hollow cylinder (1a, 11f) and accommodates the flat cable (5, 10) therein;

wherein the rotor (6, 12) has an accommodating section (6c, 12b) which closes the annular groove (1b, 11b), and a resilient fastening strap (6e, 12a) rotatably engaging a fastening portion (1e, 11e) formed on the hollow cylinder (1a, 11f).

3. The column switch having a rotary connector according to claim 2, wherein the flat cable (5, 10) has terminals (5a, 5b, 10a, 10b) on both ends of the flat cable (5, 10), one of the terminals (5a, 5b, 10a, 10b) is fixed to the base (1, 11), and the other of the terminals (5a, 5b, 10a, 10b) is secured to the rotor (6, 12).

4. The column switch having a rotary connector according to claim 1, wherein the base (14) has a hollow cylinder (14d) through which the steering shaft is inserted in line with the hollow cylinder, and an annular groove (14b) which surrounds the hollow cylinder (14d) and accommodates the flat cable therein, and wherein the rotor (13) closes the annular groove (14b) and has an annular projection (13b) which rotatably engages a resilient fastening strap (14a) formed in the annular groove (14b).

5. The column switch having a rotary connector according to claim 4, wherein the rotor (13) has the cancel cam (13a) and the annular projection (13b) on an outer circumference of the rotor, and the annular projection (13b) is formed below the cancel cam (13a) and projects outwardly from a center of the hollow cylinder (14d) farther than the cancel cam (13a).

6. The column switch having a rotary connector according to claim 4, wherein the flat cable (5, 10) has terminals (5a, 5b, 10a, 10b) on both ends of the flat cable (5, 10), one of the terminals (5a, 5b, 10a, 10b) is fixed to the base (1, 11), and the other of the terminals (5a, 5b, 10a, 10b) is secured to the rotor (6, 12).

7. A combination column switch and rotary connector assembly for a vehicle, comprising:

a base adapted to be mounted to a steering column of a vehicle, the base having a hollow cylinder through which a steering shaft of the vehicle extends and an annular groove surrounding the hollow cylinder, the base further comprising first and second recesses formed on opposite sides of the annular groove for receiving first and second switches, respectively, said first switch being a turn signal switch having a cancel claw, and said annular groove communicating with said cancel claw of said first switch through a cutout formed in said base between said annular groove and said first recess;

a rotor fitted to said base, said rotor having an accommodating section that closes said annular groove, said rotor having a cancel cam for engaging the cancel claw of said first switch; and a flexible flat cable disposed in said accommodating section between said base and said rotor, said flexible flat cable having terminals formed on both ends thereof, one of the terminals being fixed to the base, and the other of the terminals being secured to the rotor.

8. The combination of claim 7, wherein the rotor has a resilient fastening strap rotatably engaging a fastening portion formed on the hollow cylinder of the base.

9. The combination of claim 7, wherein the rotor has an annular projection that rotatably engages a resilient fastening strap formed on the base within the annular groove.

10. The combination of claim 9, wherein the cancel cam and the annular projection are formed on an outer circumference of the rotor, and the annular projection is formed below the cancel cam and projects outwardly from a center of the hollow cylinder farther than the cancel cam.

* * * * *